P. P. HINCKLEY.
PISTON RING.
APPLICATION FILED MAR. 24, 1920.

1,375,095.

Patented Apr. 19, 1921.

INVENTOR
Percy P. Hinckley
BY
ATTORNEY

UNITED STATES PATENT OFFICE.

PERCY P. HINCKLEY, OF MERIDEN, CONNECTICUT, ASSIGNOR TO FOSTER, MERRIAM & COMPANY, A CORPORATION OF CONNECTICUT.

PISTON-RING.

1,375,095.   Specification of Letters Patent.   Patented Apr. 19, 1921.

Application filed March 24, 1920. Serial No. 368,273.

*To all whom it may concern:*

Be it known that I, PERCY P. HINCKLEY, a citizen of the United States, residing at 212 Colony St., Meriden, county of New Haven, State of Connecticut, have invented an Improvement in Piston-Rings, of which the following is a specification.

This invention relates to metal piston rings and has for one of its objects to increase the elasticity of such rings. A further object of the invention is to provide a piston ring which will bear with increased and uniform radial pressure against the wall of the cylinder in which it reciprocates, and a still further object is to produce a ring whose perfect circular form will be preserved in use. Other objects and advantages of the invention will be apparent as the description proceeds.

A piston ring of the ordinary cast type is cast in continuous circular form, the diameter of said ring being made greater than the diameter of the cylinder for which the ring is intended, and a portion of the ring is subsequently removed so that the ring may be compressed to fit the cylinder, the inherent elasticity of the ring being relied upon to restore it to its original contour, but it is well known that castings so made possess but little resiliency. It will be apparent that a ring after being split and compressed as aforesaid, will not be a perfect circle, and that a ring which depends alone upon the small amount of inherent resiliently of the casting to restore it to its original shape to provide the desired outward radial pressure against the cylinder wall, is apt to fail in its purpose.

The novel piston ring of the invention is made to possess elasticity greatly in excess of that of ordinary cast rings, and as a result of this increased elasticity, my ring bears with increased and uniform radial pressure against the wall of the cylinder in which it works and has at all times perfect circular form.

Figure 1:
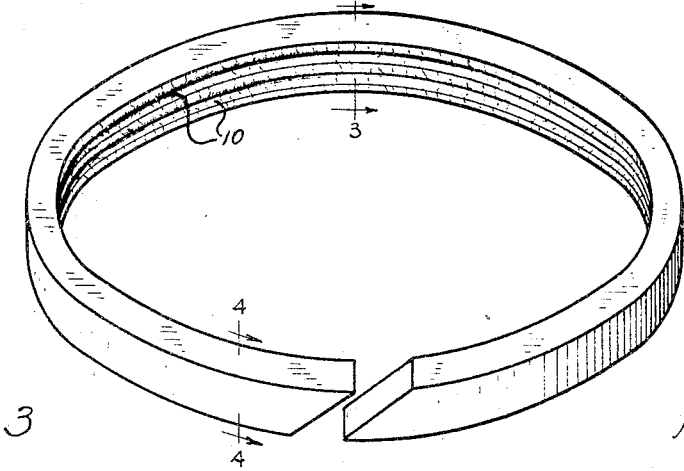
Figure 3:
Figure 4:
Figure 2:
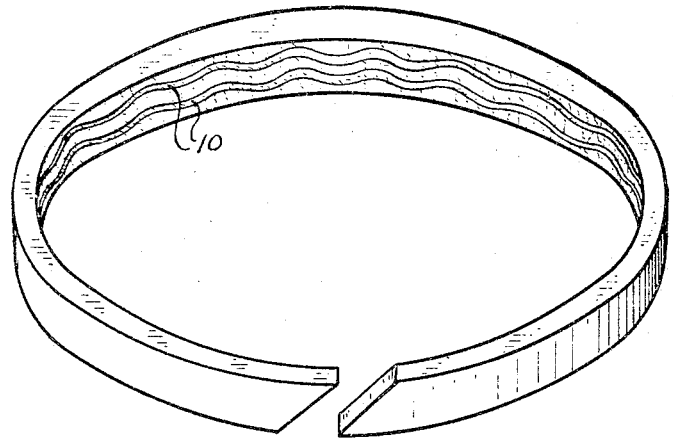
Figure 5:
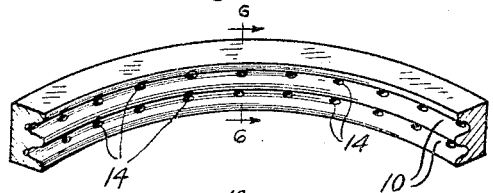

Referring to the accompanying drawing, which is a part of this specification,

Figure 1 is a perspective view of a concentric ring provided with straight, longitudinal corrugations;

Fig. 2 a perspective view of an eccentric ring having waved, longitudinal corrugations;

Fig. 3 a sectional view on line 3—3 in Fig. 1;

Fig. 4 a sectional view on line 4—4 in Fig. 1;

Fig. 5 a fragmentary perspective view of a modified form of ring; and

Figure 6:
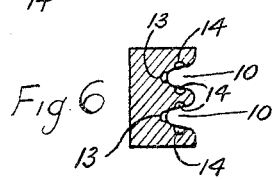

Fig. 6 is a sectional view on line 6—6 in Fig. 5.

Piston rings constructed in accordance with the scope of the present invention may be either concentric or eccentric. The rings are cast plain and are afterward rolled in any practical manner. For example, the rings may be passed between rollers, one roller, provided with longitudinal ribs or the like, engaging the inner surfaces of the rings, and the other roller, provided with a smooth surface, engaging the outer surfaces thereof, whereby the inner surfaces of the rings are provided with longitudinal corrugations, as shown at 10. The longitudinal ribs on the roller bearing against the inner surfaces may be straight to form straight corrugations, as in Fig. 1, or curved, to form curved corrugations, as in Fig. 2, the rings may be rolled either before or after splitting, and there may be any desired number of lines of straight or curved corrugations in the case of either concentric or eccentric rings, two or three lines being preferable, two for rings of narrow width and three for wider rings. I preferably do not remove the scale from the inner surfaces of the rings, but perform the rolling operation directly against the scale, so that it, as well as the material of the casting beneath it, is acted upon and affected by the rolling operation. The rollers may be set a fixed and predetermined distance apart and the rib on the roller having contact with the inner surfaces may be so constructed that the corrugations made thereby are deepest at the point opposite the split in the rings, indicated by 11 in Fig. 3, the depths decreasing, uniformly or otherwise, as may be desirable, from this point toward both ends, as more clearly indicated by 12 in Fig. 4, and merging into the inner surfaces of the rings at or near said ends, so as to provide for equal radial pressure at all points. However, I do not limit myself to any particular method of rolling the corrugations and it is to be understood that they may be rolled in any desired or preferred manner. The rolling of corrugations in the castings compresses the scales thereof and the metal contiguous to said scales, and consequently, makes the rings much more resilient, thus furnishing them with an additional amount of elasticity whereby they are better capable of supplying the desired outward radial pressure against the wall of the cylinder, and the rolling of the corrugations as specifically performed by me, in addition to spreading apart the ends of said rings, supplies the rings with the resiliency necessary to make them return to exact circular form after being compressed and placed in the cylinders. The deeper the corrugations are rolled, the greater the resultant resiliency, so that the greatest resiliency of the rings of the invention is directly opposite the ends of said rings, and said ends are accordingly uniformly spread apart.

It will be apparent that the rolling operation may be made to take care automatically of rings of varying thickness. That is, thicker parts of a ring, which are less resilient, may be made to receive greater pressure from the rolls and the corrugations will accordingly be cut deeper at the thicker points, so that resiliency is made equal at corresponding points in each ring. It will also be apparent that rings which are heavy and less resilient on account of their thickness, may, by being provided with longitudinal corrugations, be rendered as resilient as rings of lighter weight, and castings which may unavoidably have different and varying densities, are rendered more uniformly dense when corrugated by rolling, by reason of the pressure of the ribs of the roller, said pressure acting to compress the casting in the direction of the thickness thereof, particularly the inside scale of said casting and the metal contiguous thereto. And it will further be apparent that I have provided for the production of rings which have great inherent ability to bear with increased pressure against the cylinder wall, particularly in the case of rings which are comparatively light, without increasing the weight of such rings.

Figs. 5 and 6 show a modification of the invention. In this form the rings are provided with longitudinal corrugations, either straight or curved, as in the preferred form. As shown at 13, each line of corrugations, whether straight or curved, may be provided with indentations at its bottom, which can be impressed in said bottom during the rolling operation by providing teats or projections on the ribs which form the corrugations, or can be impressed in a separate operation. Each line may also be provided with indentations 14, in one or both of its sides, which can be impressed after the operation of rolling the corrugations, either by rolling or hammering. The indentations in the bottom and sides may be of any desired depths, may be placed apart any desired distances, and any number of them may be impressed, as may be desirable. The indentations, when impressed, assist in imparting the desired characteristics to the rings, as will be apparent.

Piston rings constructed in the manner described will at once adapt themselves to the contour of the cylinder walls, and will, therefore, from the time of their insertion in cylinders, have accurate and proper engagement with the walls thereof so as to at all times ideally perform the functions for which intended, and by reason of their proper fit on the pistons and in the cylinders, they are not subjected when in use to strains encountered by rings not so accurately and perfectly made and fitted. The rings are, therefore, capable of very satisfactory use over long periods of time.

I have produced a piston ring which can be economically manufactured, and which can be easily installed without danger of breaking by reason of the fact that the rings of my invention are rendered resilient axially as well as radially.

What I claim is:

1. A piston ring the inner surface of which is provided with longitudinal, rolled corrugations, said corrugations being deepest at the point opposite the opening in said ring and decreasing in depth toward the ends of said ring.

2. A piston ring the inner surface of which is provided with longitudinal, rolled corrugations, said corrugations being deepest at the point directly opposite the opening in said ring and uniformly decreasing in depth toward the ends of said ring.

3. A piston ring the inner surface of which is provided with longitudinal, rolled corrugations for approximately the length of said ring, said corrugations being deepest at the point opposite the opening in said ring and decreasing in depth toward both ends of said ring.

4. A piston ring the inner surface of which is provided with longitudinal, rolled corrugations, said corrugations being deepest at the point directly opposite the opening in said ring and uniformly decreasing in depth toward the ends of said ring and terminating at or near said ends, whereby said ring may have perfect circular form and may bear with increased and uniform radial pressure against the wall of a cylinder when inserted therein.

5. A piston ring the inner surface of which is provided with longitudinal, rolled corrugations deepest at the point directly opposite the opening and uniformly decreasing in depth toward the ends of said ring, said corrugations having indentations in the bottoms thereof, whereby said ring will be rendered sufficiently resilient to return to perfect circular form to exert increased and uniform radial pressure against the wall of a cylinder.

6. A piston ring the inner surface of which is provided with longitudinal, rolled corrugations deepest at the point directly opposite the opening and uniformly decreasing in depth toward the ends of said ring, said corrugations having indentations in the bottoms and sides thereof.

7. A piston ring the inner surface of which is provided with longitudinal, rolled corrugations deepest at the point directly opposite the opening and uniformly decreasing in depth toward the ends of said ring, said corrugations having indentations in the bottoms and sides thereof, the indentations opposite the ends of the rings being deepest, and the indentations being of uniformly less depth as they approach the ends of said ring.

In testimony whereof I affix my signature.

PERCY P. HINCKLEY.